(12) United States Patent
Beer et al.

(10) Patent No.: US 7,788,523 B2
(45) Date of Patent: *Aug. 31, 2010

(54) METHOD AND APPARATUS FOR RELATING DEVICE NAME TO PHYSICAL LOCATION OF DEVICE ON A NETWORK

(75) Inventors: Reginald Beer, Eastleigh (GB); Paul Nicholas Cashman, Alton (GB); Paul Hooton, Eastleigh (GB); Ian David Judd, Winchester (GB); Robert Frank Maddock, Christchurch (GB); Neil Morris, Southsea (GB); Robert Bruce Nicholson, Southsea (GB); Paul Jonathan Quelch, Emsworth (GB); Barry Douglas White, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 135 days.

This patent is subject to a terminal disclaimer.

(21) Appl. No.: 12/030,966

(22) Filed: Feb. 14, 2008

(65) Prior Publication Data
US 2008/0155096 A1 Jun. 26, 2008

Related U.S. Application Data

(63) Continuation of application No. 10/290,795, filed on Nov. 8, 2002, now Pat. No. 7,398,415.

(30) Foreign Application Priority Data
Jan. 19, 2002 (GB) ................................ 0201214.4

(51) Int. Cl.
*G06F 11/00* (2006.01)

(52) U.S. Cl. ................................. 714/4; 714/5
(58) Field of Classification Search ....................... None
See application file for complete search history.

(56) References Cited

U.S. PATENT DOCUMENTS

| 5,768,551 A | 6/1998 | Bleiweiss et al. | 710/316 |
| 6,473,868 B1 | 10/2002 | Fujitani | 714/8 |

(Continued)

OTHER PUBLICATIONS

American National Standard for Technology, "Fibre Channel Arbitrated Loop (FC-AL-2)", Revision 7.0 Apr. 1, 1999, 154 pages.

(Continued)

*Primary Examiner*—Yolanda L Wilson
(74) *Attorney, Agent, or Firm*—Harrington & Smith

(57) ABSTRACT

A method and apparatus for relating a device name to a physical location of a device (202) on a network is provided. The network may be a serial loop network, for example a Fibre Channel Arbitrated Loop network. The network includes a plurality of devices (202) on or connected to the network (201) and a control device (205) with control over at least one of the devices (202). Each device (202) has a check output (204) independent of the network (201) with connection means (206) to a control device (205). The method includes the step of sending a device name from the check output (204) of a device (202) to the control device (205). The check output (204) of a device (202) is also connected to an external indication means for indicating the failure of the device (202).

23 Claims, 3 Drawing Sheets

U.S. PATENT DOCUMENTS 6,571,355 B1    5/2003   Linnell ........................... 714/9
6,678,839 B2    1/2004   Mori ............................ 714/44
2003/0079156 A1    4/2003   Sicola et al. ................... 714/4

OTHER PUBLICATIONS http://en.wikipedia.org/wiki/Enclosure_Services_Interface.

METHOD AND APPARATUS FOR RELATING DEVICE NAME TO PHYSICAL LOCATION OF DEVICE ON A NETWORK

CROSS-REFERENCE TO RELATED APPLICATIONS

This patent application is a continuation of copending U.S. patent application Ser. No. 10/290,795, filed on Nov. 8, 2002, now U.S. Pat. No. 7,398,415 which claims priority under 35 U.S.C. §119 from Great Britain patent application no. 0201214.4, filed Jan. 19, 2002.

FIELD OF INVENTION

This invention relates to a method and apparatus for relating a device name to the physical location of a device on a network. In particular, the invention relates to loop networks in the form of Fibre Channel Arbitrated Loops. The invention could equally apply to other interconnect topologies.

BACKGROUND OF THE INVENTION

Fibre Channel Arbitrated Loop (FC-AL) architecture is a member of the Fibre Channel family of ANSI standard protocols. FC-AL is typically used for connecting together computer peripherals, in particular disk drives. The FC-AL architecture is described in NCITS working draft proposal, American National Standard for Information Technology "Fibre Channel Arbitrated Loop (FC-AL-2) Revision 7.0", 1 Apr. 1999.

Electronic data systems can be interconnected using network communication systems. Area-wide networks and channels are two technologies that have been developed for computer network architectures. Area-wide networks (e.g. LANs and WANs) offer flexibility and relatively large distance capabilities. Channels, such as the Small Computer System Interface (SCSI), have been developed for high performance and reliability. Channels typically use dedicated short-distance connections between computers or between computers and peripherals.

Fibre Channel technology has been developed from optical point-to-point communication of two systems or a system and a subsystem. It has evolved to include electronic (non-optical) implementations and has the ability to connect many devices, including disk drives, in a relatively low-cost manner. This addition to the Fibre Channel specifications is called Fibre Channel Arbitrated Loop (FC-AL).

Fibre Channel technology consists of an integrated set of standards that defines new protocols for flexible information transfer using several interconnection topologies. Fibre Channel technology can be used to connect large amounts of disk storage to a server or cluster of servers. Compared to Small Computer Systems Interface (SCSI), Fibre Channel technology supports greater performance, scalability, availability, and distance for attaching storage systems to network servers.

Fibre Channel Arbitrated Loop (FC-AL) is a loop architecture as opposed to a bus architecture like SCSI. FC-AL is a serial interface, where data and control signals pass along a single path rather than moving in parallel across multiple conductors as is the case with SCSI. Serial interfaces have many advantages including: increased reliability due to point-to-point use in communications; dual-porting capability, so data can be transferred over two independent data paths, enhancing speed and reliability; and simplified cabling and increased connectivity which are important in multi-drive environments. As a direct disk attachment interface, FC-AL has greatly enhanced I/O performance.

Devices are connected to a FC-AL using hardware which is termed a "port". A device which has connections for two loops has two ports or is "dual-ported".

The operation of FC-AL involves a number of ports connected such that each port's transmitter is connected to the next port's receiver, and so on, forming a loop. Each port's receiver has an elasticity buffer that captures the incoming FC-AL frame or words and is then used to regenerate the FC-AL word as it is re-transmitted. This buffer exists to deal with slight clocking variations that occur. Each port receives a word, and then transmits that word to the next port, unless the port itself is the destination of that word, in which case it is consumed. The nature of FC-AL is therefore such that each intermediate port between the originating port and the destination port gets to 'see' each word as it passes around the FC-AL loop.

FC-AL architecture may be in the form of a single loop. Often two independent loops are used to connect the same devices in the form of dual loops. The aim of these loops is to provide an alternative path to devices on a loop should one loop fail. A single fault should not cause both loops to fail simultaneously. More than two loops can also be used.

FC-AL devices typically have two sets of connections allowing them to be attached to two FC-ALs. Thus, in a typical configuration, two independent loops exist and each device is physically connected to both loops. When the system is working optimally, there are two possible loops that can be used to access any dual-ported device.

A FC-AL can incorporate bypass circuits with the aim of making the FC-AL interface sufficiently robust to permit devices to be removed from the loop without interrupting throughput and sacrificing data integrity. If a disk drive fails, port bypass circuits attempt to route around the problem so all disk drives on the loop remain accessible. Without port bypass circuits a fault in any device will break the loop.

In dual loops, port bypass circuits are provided for each loop and these provide additional protection against faults. A port can be bypassed on one loop while remaining active on the dual loop.

A typical FC-AL may have one or two host bus adapters (HBA) and a set of approximately six disk drive enclosures or drawers, each of which may contain a set of ten to sixteen disk drives. There is a physical cable connection between each enclosure and the HBA in the FC-AL. Also, there is a connection internal to the enclosure or drawer, between the cable connector and each disk drive in the enclosure or drawer, as well as other components within the enclosure or drawer, e.g. SES device (SCSI Enclosure Services node) or other enclosure services devices.

Components in a loop can be categorized as "initiators" or "targets", or both depending on their function in the loop. For example, a host bus adapter is an initiator and a disk drive is a target. Initiators can arbitrate for a communication path in the loop and can choose a target. A target can request the transfer of a command, data, status, or other information to or from the initiator.

If there is a single initiator in a loop, the initiator will login with all the targets in the loop. Targets may accept or reject this login attempt. At any later stage a target can log out with any logged in initiator. In a multi-initiator environment, an initiator operates as both a sender and recipient login attempts.

FC-AL products have a 7-bit hard address setting for the FC-AL devices. Other loop topologies may have other number of bits. Some of the bits are used to identify the enclosure and the remaining bits of the address identify the devices within that enclosure. There must be sufficient bits for all the devices in an enclosure to be identified individually. In one example of a typical FC-AL system, an enclosure address switch sets the most significant 3 bits of the address and the least significant 4 bits of the address are used to differentiate between the 16 devices within the enclosures. The resultant address is of the form [enc-number, slot-number].

If two enclosures within the same FC-AL loop have the same address switch setting, there will be a bus conflict. The EC-AL addressing scheme is quite sophisticated, so in this case the Loop Initialisation Primitive (LIP) process will result in some of the devices using a method called "soft addressing".

The nature of FC-AL is that almost all error detection and recovery is on a loop or connection basis. There is almost no link level error recovery. This means that an individual faulty device or link can inject noise into the loop or even break it altogether, rendering it useless for data transfer. In order to overcome this shortcoming, most FC-AL systems are configured using the dual loop arrangement previously described. In such a system, if one loop is rendered inoperative the other loop can be used to recover the system. The failing loop is recovered by arranging for the faulty nodes to by bypassed or electrically removed from the loop.

The algorithm that determines which nodes should be bypassed on the loop is typically implemented by one or more "controlling agents" which might reside in an "outboard controller", a SCSI enclosure services (SES) device, a Host Bus Adapter (HBA) or a host device driver. For the purposes of this disclosure it is assumed that there is only one controlling agent, residing in an HBA. In order to actually bypass a device, the controlling agent must send a SCSI command to the SES node in the enclosure containing the node, since it is the SES node which has the electrical connection which triggers the bypass circuit. The issue which complicates this task is one of addressing.

Each port in a loop network has a port identifier called a "World Wide Port Name" (WWPN). Each node on a loop in the form of devices or host bus adapters also has a World Wide Node Name (WWNN). These World Wide Names are referred to as Node Names and Port Names. To ensure that the WWPN and WWNN are unique they may contain, for example, a unique identifier of the manufacturer of the device including the port and the manufacturer's serial number of the device. The WWPN is too long (usually 64 bits) to be used for source and destination addresses transmitted over the network and therefore the ALPA (Arbitrated Loop Physical Address) is used as a temporary address that is unique to the configuration of the network at any given time.

Every device has a World Wide Node Name (WWNN) which never changes and which is known to the HBA. The loop initialisation procedure sequence results in the HBA also knowing the arbitrated loop ID of a faulty device which is it's FC-AL address known as the Arbitrated Loop Physical Address (AL_PA).

The SES node however does not know this address; it knows the devices only by the slot number they occupy. Thus the command sent to the SES node to bypass the faulty device is addressed to [ses-node, slot-number] and so the controlling agent must have a reliable means at its disposal to translate from the AL_PA or WWNN to [ses-node, slot-number].

The problem of mapping between AL_PA or WWNN and [ses-node, slot-number] is made more difficult by the possibility of "non-participating devices". A non-participating device is one which looks to the SES controller as if it exists on the arbitrated loop but which has decided not to participate in arbitration and therefore has not acquired an AL_PA. The presence of non-participating nodes renders unsafe any topology based scheme using the physical topology of the loop reported by the Loop Initialisation Loop Position (LILP) phase of the loop initialisation.

If the controlling agent uses an unreliable scheme to map AL_PA to [ses-node, slot-number] when it sends the command to the SES controller, the result is that the wrong device is fenced out. In that situation there would be two devices which cannot be addressed. This is disastrous in a RAID environment because any data stored in the devices cannot be accessed.

If the controlling agent had an accurate table which mapped the identity of each device to an identifiable enclosure number and slot number then the fencing out process would be much more reliable.

The aim of the present invention is to provide a method which allows a controlling agent to map the device name in the form of the World Wide Name or AL_PA of all devices on a loop to their physical location.

DISCLOSURE OF THE INVENTION

According to a first aspect of the present invention there is provided a method for relating a device name to a physical location of a device on a network, the network including a plurality of devices on or connected to the network, a control device with control over at least one of the devices, each device having a check output independent of the network with connection means to a control device, the method comprising: sending a device name from the check output of a device to the control device.

The check output of a device may also be connected to an external indication means for indicating the failure of the device. The external indication means may be an LED or LCD display.

The network may include at least one initiator on or connected to the network. The initiator may interrogate the control device to obtain the device names of the devices under the control of the control device and the initiator may map the device names to the physical location of the devices in the network.

A device may send the device name to the control device in pulses according to a protocol. The pulses may be short enough to be invisible to the human eye. The protocol may contain parity or another correction mechanism. The protocol may contain framing information so that a receiver can detect the beginning of the device name. Preferably, the polarity of the signal containing the device name can be inverted.

The network may be a serial loop network and may have at least one enclosure containing s one or more devices. The control device may be an enclosure control device and may know the physical location of the devices in the enclosure.

The network may be a Fibre Channel Arbitrated Loop (FC-AL) network with one or more loops and the control device may be a SCSI enclosure services (SES) device or a SALF-TE device. The initiator may be a host bus adapter, a RAID controller or a SES device. The device name may be the World Wide Node Name of the device.

According to a second aspect of the present invention there is provided an apparatus for relating a device name to a physical location of a device on a network, the network comprising: a plurality of devices on or connected to the network; a control device with control over at least one of the devices; each device having a check output independent of the network with connection means to a control device; means for sending a device name from the check output of a device to the control device.

The check output of a device may also be connected to an external indication means for indicating the failure of the device. The external indication means may be an LED or LCD display.

The network may include at least one initiator on or connected to the network.

The means for sending a device name to the control device may send the device name in pulses according to a protocol. The pulses may be short enough to be invisible to the human eye. The protocol may contain parity or other correction mechanism. The protocol may contain framing information so that the receiver can detect the beginning of the device name. Preferably, the polarity of the signal containing the device name can be inverted.

The network may be a serial loop network and may have at least one enclosure containing one or more devices. The control device may be an enclosure control device.

The network may be a Fibre Channel Arbitrated Loop (FC-AL) network with one or more loops and the control device may be a SCSI enclosure services (SES) device or a SAF-TE device. The initiator may be a host bus adapter, a RAID controller or a SES device. The device name may be the World Wide Node Name of the device.

According to a third aspect of the present invention there is provided a computer program product stored on a computer readable storage medium comprising computer readable program code means for relating a device name to a physical location of a device on a network, the network having a plurality of devices on or connected to the network, a control device with control over at least one of the devices, each device having a check output independent of the network with connection means to a control device, the program code means performing the step of: sending a device name from the check output of a device to the control device.

BRIEF DESCRIPTIONS OF THE DRAWINGS

Embodiments of the invention are now described, by means of examples only, with reference to the accompanying drawings in which.

DESCRIPTION OF THE PREFERRED EMBODIMENTS

A loop network system with a plurality of serially connected ports in the form of a Fibre Channel Arbitrated Loop (FC-AL) is described for connecting together computer peripheral devices, in particular disk drives. The described embodiments are given in the context of FC-AL architecture although the described method and apparatus could be applied to other networks.

Figure 1A:
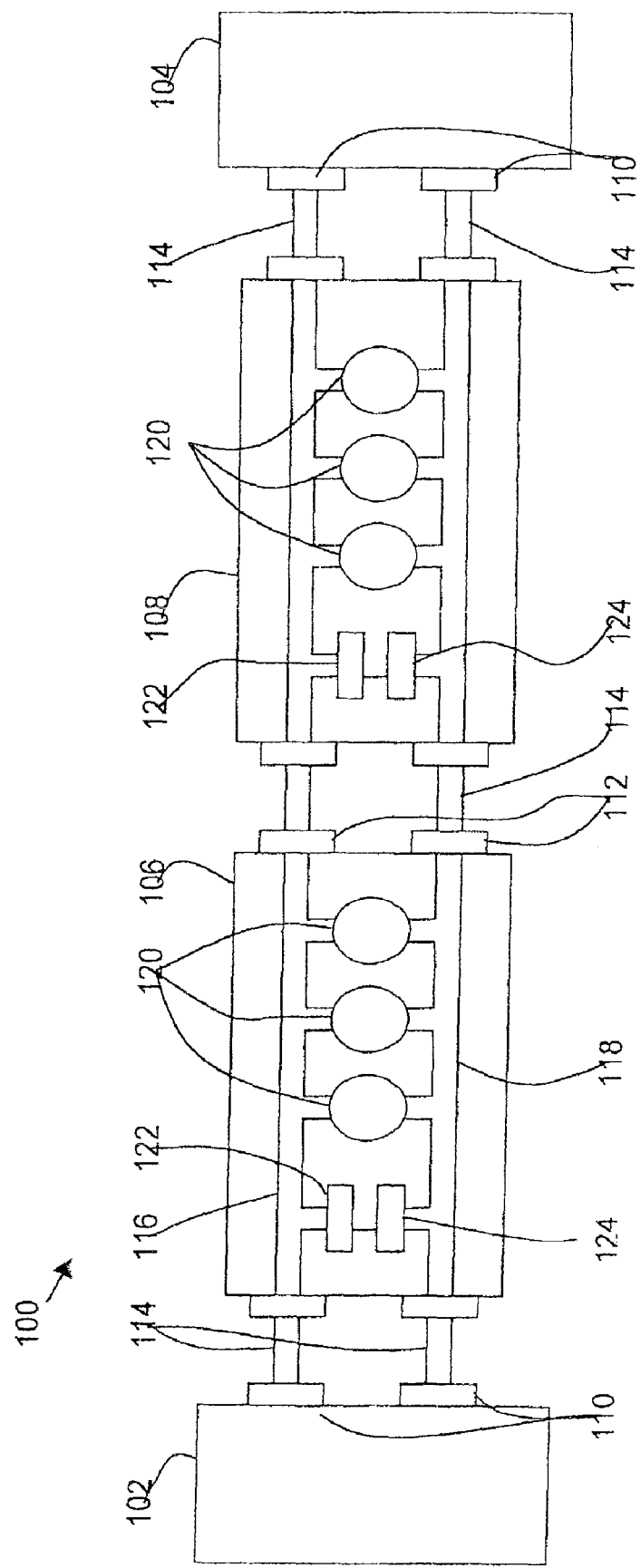
FIG. 1A is a diagram of a dual loop network in accordance with the prior art.

Referring to FIG. 1A, an exemplary loop network 100 is shown in the form of a Fibre Channel Arbitrated Loop with two host bus adapters 102, 104. FIG. 1A shows one form of a loop network on which the present invention may be practiced. However, not all the components of the loop network 100 of FIG. 1A are essential for the operation of the present invention.

The loop network 100 in the shown embodiment has two enclosures 106, 108. Each enclosure in this embodiment has three disk drives 120 although in practice there are usually 10 or more disk drives in an enclosure. Dual loops 116, 118 each connect the components in the loop network 100. A first loop 116 is shown along the top of the loop network 100 in the diagram and a second loop 118 is shown along the bottom of the loop network 100 in the diagram.

The adapters 102, 104 have external connectors 110 for cables 114 connecting each loop 116, 118 from the adapters 102, 104 to external connectors 112 of the enclosures 106, 108. Cables 114 also connect the two enclosures 106, 108 such that each loop 116, 118 passes from one enclosure 106 to the next enclosure 108.

Each loop 116, 118 passes from the first adapter 102 via an adapter external connector 110, a cable 114 and an enclosure external connector 112 to the first enclosure 106. In the first enclosure 106 of the exemplary loop network 100, each loop 116, 118 passes through its own enclosure control device 122, 124 which may be, for example, a SES (SCSI Enclosure Services) device or a SAF-TE device and then through each of the disk drives 120 in turn. The two loops 116, 118 both pass through the same shared disk drives. Each loop 116, 118 then leaves the first enclosure via an enclosure external connector 112 and passes through a cable 114 to a second enclosure 108 which it enters via an enclosure external connector 112. The second enclosure 108 has the same set of components as the first enclosure 106. Each loop 116, 118, after passing through the second enclosure 108 is connected to the second adapter 104 via enclosure external connectors 112, cables 114 and adapter external connectors 110.

In each enclosure 106, 108, a loop 116 enters from an external connector 112 and is routed through each of the disk drives 120 and an enclosure control device 122, 124. Each disk drive 120 or enclosure control device 122, 124 has a bypass circuit to enable it to be bypassed by the loop, if required. The disk drives 120 are examples of dual port devices in that they are common to both the loops 116, 118 of the loop network 100.

An enclosure control device 122, 124 is provided on each loop 116, 118 in each enclosure and the two enclosure control devices 122, 124 are connected together through the enclosure's backplane. One enclosure control device can be used to control the other enclosure control device. An enclosure control device manages an enclosure and provides a point of control for each enclosure. It can monitor parameters such as power and cooling and obtain information as to which slots for disk drives are occupied. The enclosure control devices can be in the form of SES devices which accept a limited set of SCSI commands. Enclosure control devices can be used to instruct a bypass of a disk drive and to check which disk drives are bypassed.

In the embodiment shown in FIG. 1A, a dual loop network 100 is shown by way of example, with two enclosures 106, 108 each with three disk drives 120 and two enclosure control devices 122, 124, one for each loop. Typical loop networks may have one or two host bus adapters and a set of six or so disk drive enclosures each of which may typically contain a set of ten to sixteen disk drives.

All devices in the loop 100, including host bus adapters 102, 104, disk drives 120 and any enclosure control devices 122, 124 have hardware connections to a loop 116, 118 referred to as ports. Each port has a receiver and a transmitter. The ports are connected such that each port's transmitter is connected to the next port's receiver, and so on, forming the loop 116, 118.

Figure 1B:
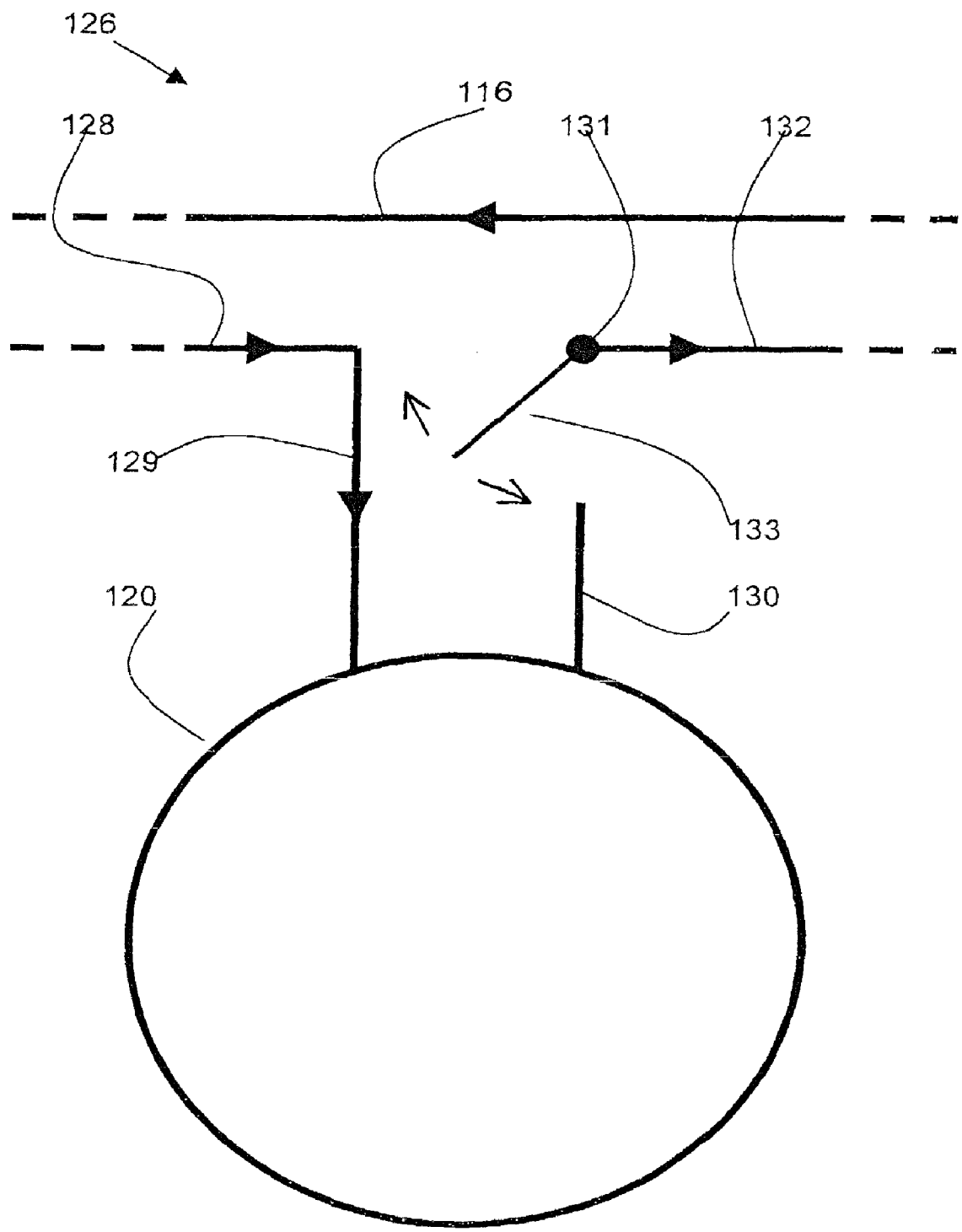
FIG. 1B is a diagram of a detail of FIG. 1A showing a bypass port of a device on the s loop network.

FIG. 1B is a detail of a bypass 126 for a device 120 in the first loop 116. The loop 116 10 has a path 128 travelling from left to right which is routed off along a path 129 to travel to the device 120. The loop 116 returns from the device 120 along a return path 130 parallel to the path 129 to the device 120. The return path 130 meets a junction 131 and continues the left to right path 132 of the loop 116 towards the next device 120. The junction 131 in effect has a switch 133 which can join the left to right paths 128, 132 to bypass the device 120.

Each port in a loop network has a port identifier called a "World Wide Port Name" (WWPN). Each node on a loop in the form of devices or host bus adapters also has a World Wide Node Name (WWNN). These are referred to as Node Names and Port Names. To ensure that the WWPN and WWNN are unique they may contain, for example, a unique identifier of the manufacturer of the device including the port and the manufacturer's serial number of the device. The WWPN is too long (usually 64 bits) to be used for source and destination addresses transmitted over the network and therefore the AL_PA is used as a temporary address that is unique to the configuration of the network at any given time.

During initialisation of a loop, a Loop Initialisation Procedure allows each port to obtain an Arbitrated Loop Physical Address (AL_PA) that is unique within the loop for that port. This effectively uniquely identifies each port in a loop. The AL_PAs can be defined by previous addresses, assigned hardware addresses or software addresses. If there are multiple enclosures, each address indicates the enclosure and the device within the enclosure ensuring that each port in a loop has a unique address.

Figure 2:
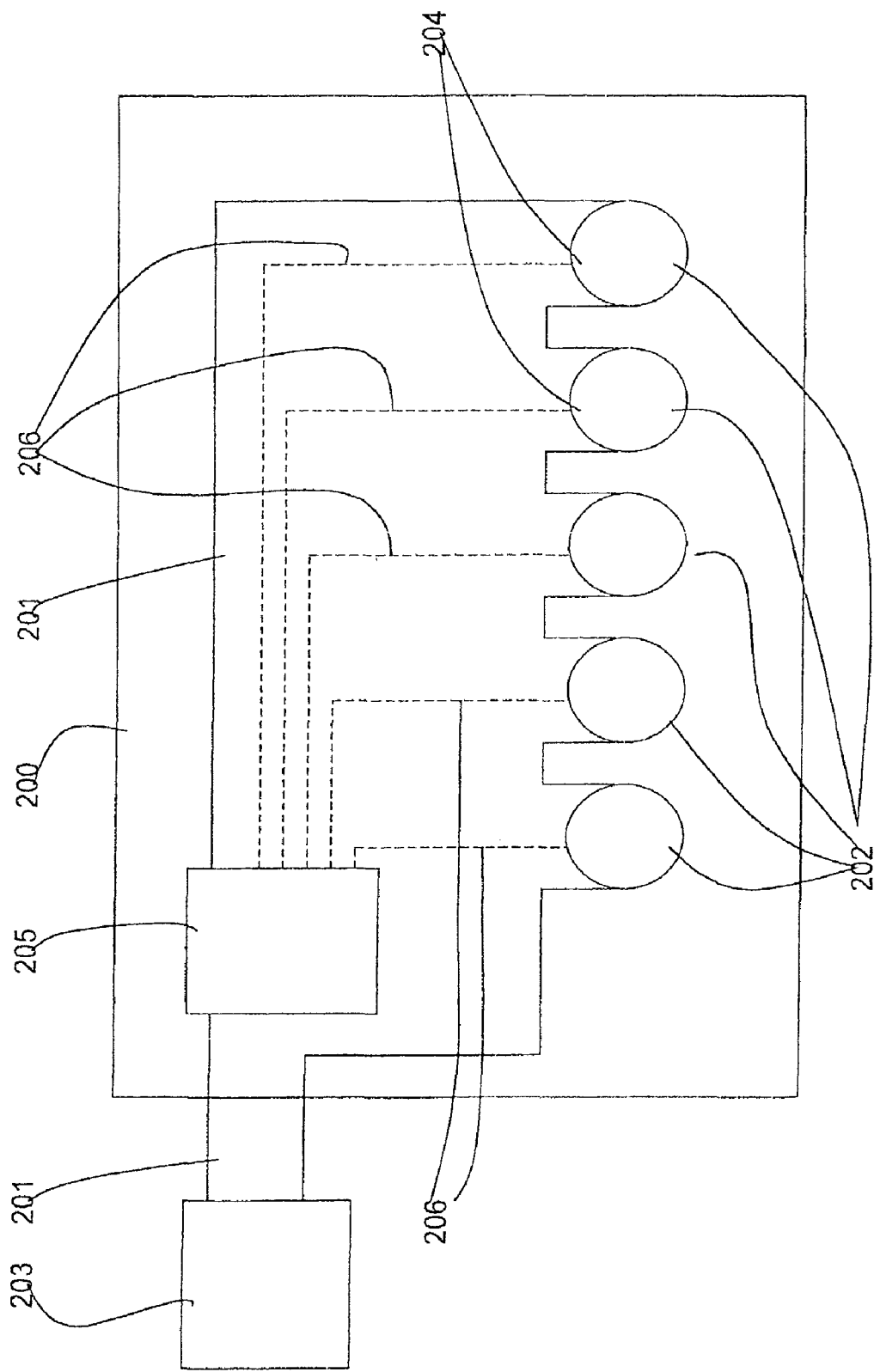
FIG. 2 is a diagram of one enclosure of a single loop network in accordance the present invention.

Referring to FIG. 2, one enclosure 200 on a loop network with a single FC-AL loop 201 is shown. The enclosure 200 contains five disk drives 202 and an SES node or controller 205. The disk drives 202 and the enclosure control device 205 each have inputs and outputs connecting them in the FC-AL loop 201. The enclosure 200 is connected to an HBA 203 by the FC-AL loop 201. More than one enclosure may be connected on the FC-AL loop 201 and the more than one enclosure may be connected to the HBA 203. There may also be more than one HBA on the loop 201.

Each disk drive 202 has an output pin 204 which can be used to drive a "check" LED in the event of a failure of a disk drive 202. The output pins 204 from each disk drive 202 are connected to the enclosure control device 205 by individual wires 206. Each of the wires 206 is also connected to an external LED (not shown).

Following a loop initialisation sequence, each disk drive 202 pulses out its World Wide Node Name (WWNN) on the check LED wire 206. The protocol used may be any protocol which may include the following characteristics:

1. It contains parity or other creation mechanism.

2. It contains pulses short enough to be invisible to the human eye.

3. It contains framing information so that the receiver can detect the beginning of the WWNN.

4. It has the characteristic that the polarity of the signal may be inverted. This is so that the scheme still works when the check LED light is illuminated, in which case the short "on" pulses would be replaced with short "off" pulses.

The enclosure control device 205 remembers the WWNN of each disk drive 202 in the enclosure 200 so that it can be reported in response to a subsequent SCSI command from the HBA 203.

After the HBA 203 has processed the loop initialisation procedure, it sends a command to the enclosure control device 205 in each enclosure 200 on the loop 201. The enclosure control device 205 of each enclosure 200 responds with a table relating each slot within the enclosure 200 to the WWNN of the disk drive 202 in that slot. The HBA 203 can then build a reliable map of the relationship between the AL_PA, WWNN, enclosure WWN and the slot number.

If a serious fault then occurs, and the loop 201 is disrupted by a faulty disk drive 202, the HBA 203 can refer to the map that it built and can send a SCSI command to a specific enclosure control device 205 to tell it to activate the bypass circuit for a specific slot number within that enclosure.

The described method can be implemented by software only as check wires may already exist and does not require any hardware modifications to existing HBAs, FC-AL enclosures or disk drives.

The Standard, SFF-8067, Revision 2.0, 9 Nov. 1998, defines the signals and connectors used in Fibre Channel applications.

The method is described in relation to Fibre Channel Arbitrated Loop systems. The method can also be applied to other serial loop protocols. The method can also be extended to:
 any maximum number of devices;
 devices other than disk drives;
 more than one HBA in a loop;
 SCSI initiators other than the HBA, for example a SES processor or RAID controller.

The described method and apparatus has the benefit that the design is simple and is straightforward to implement and to test. It scales naturally to large numbers of HBAs and it has the further advantage that it does not require the HBAs to negotiate a master. The method and apparatus also provide a robust means of communicating the WWNN of a FC-AL device when the FC-AL loop is not operational.

The method described herein is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

What is claimed is:

1. An apparatus for relating a device name to a physical location of a device on a network, the network comprising a plurality of devices on or connected to the network, the apparatus comprising:
 a control device with control over at least one of the devices;
 each device comprising a check output pin that is driven by the device to indicate an operational status of the device, the check output pin for connection to an associated individual wire that is independent of the network for coupling to the control device; and
 circuitry for sending a device name, using the associated individual wire that is independent of the network, from the check output pin of a device to the control device.

2. An apparatus as claimed in claim 1, wherein the check output pin of a device is also connected to an external indicator for indicating failure of the device.

3. An apparatus as claimed in claim 2, wherein the external indicator comprises an LED or LCD display.

4. An apparatus as claimed in claim 1, wherein the network includes at least one initiator on or connected to the network.

5. An apparatus as claimed in claim 4, wherein the initiator comprises one of a host bus adapter, a RAID controller or a SES device.

6. An apparatus as claimed in claim 1, wherein the circuitry sends the device name in pulses according to a protocol.

7. An apparatus as claimed in claim 6, wherein the pulses are short enough to be invisible to the human eye.

8. An apparatus as claimed in claim 6, wherein the protocol contains parity or other correction mechanism.

9. An apparatus as claimed in claim 6, wherein the control device comprises a receiver that is coupled to the check output pin of a device, wherein the protocol contains framing information so that the receiver can detect the beginning of the device name.

10. An apparatus as claimed in claim 1, wherein the polarity of a signal containing the device name can be inverted.

11. An apparatus as claimed in claim 1, wherein the network comprises a serial loop network and has at least one enclosure containing at least one device.

12. An apparatus as claimed in claim 1, wherein the control device comprises an enclosure control device.

13. An apparatus as claimed in claim 1, wherein the network comprises a Fibre Channel Arbitrated Loop (FC-AL) network with one or more loops and the control device comprises one of a SCSI enclosure services (SES) device or a SAF-TE device.

14. An apparatus as claimed in claim 1, wherein the device name is the World Wide Node Name of the device.

15. A computer program product stored on a computer readable storage medium comprising computer readable program code means for relating a device name to a physical location of a device on a network, the network having a plurality of devices on or connected to the network, a control device with control over at least one of the devices, each device having a check output pin that is driven by the device to indicate an operational status of the device, the check output pin for connection to an associated individual wire that is independent of the network with connection means to a control device, the program code means performing the step of:
sending a device name, using the associated individual wire that is independent of the network, from the check output of a device to the control device.

16. An enclosure that comprises at least one disk drive coupled through a loop network to an enclosure controller and a controller external to the enclosure, individual ones of the disk drives occupying an individual one of a plurality of enclosure slots, comprising:
wiring for coupling a disk drive output pin via at least one individual wire to a visual indicator and to an input of the enclosure controller, wherein the disk drive output pin drives the visual indicator, wherein the at least one individual wire is independent of the loop network;
disk drive circuitry, responsive to an initialization procedure, for pulsing the disk drive output pin for transmitting data to the input of the enclosure controller in a bit serial format, the data comprising a disk drive name; and
enclosure controller circuitry, coupled to the input of the enclosure controller and to the loop network, for reporting the disk drive name and an identification of the slot occupied by the disk drive to the external controller.

17. An enclosure as in claim 16, where the circuitry of the enclosure controller is responsive to a receipt of a disk drive bypass command from the external controller, the disk drive bypass command comprising the identification of the slot occupied by a disk drive to be bypassed.

18. An enclosure as in claim 16, where the loop network comprises a Fibre Channel Arbitrated Loop network.

19. An enclosure as in claim 16, where the disk drive name comprises a World Wide Node Name of the disk drive.

20. A data storage system comprising at least one enclosure that comprises a plurality of disk drives coupled through a Fibre Channel Arbitrated Loop network to an enclosure controller and a controller external to the enclosure, individual ones of the disk drives occupying an individual one of a plurality of enclosure slots, comprising:
a memory for storing a map that is accessible to the external controller, the map comprising information for associating each disk drive with an identification of the enclosure slot occupied by the disk drive; and
circuitry, responsive to a failure of a disk drive, for transmitting a command from the external controller to the enclosure controller, the command identifying a disk drive to be bypassed and comprising the identification of the enclosure slot occupied by the disk drive to be bypassed, further comprising wiring for coupling a disk drive output pin via at least one individual wire to a visual indicator and to an input of the enclosure controller, wherein the disk drive output pin drives the visual indicator, wherein the at least one individual wire is independent of the Fibre Channel Arbitrated Loop network; disk drive circuitry, responsive to an initialization procedure, for pulsing the disk drive output pin for transmitting data to the enclosure controller in a bit serial format, the data comprising a disk drive name; circuitry in said enclosure controller for reporting each disk drive name and the identification of the slot occupied by the disk drive to the external controller via the loop network; and map circuitry for building the map so as to comprise the reported identification of the enclosure slot occupied by each disk drive.

21. A data storage system as in claim 20, where the disk drive name comprises a World Wide Node Name of the disk drive.

22. A disk drive comprising an interface for coupling to a loop network and a status output pin for coupling through individual wiring to a visual indicator, said individual wiring being independent of the loop network, said disk drive comprising a disk drive controller that is responsive to an initialization procedure for pulsing the status output pin for transmitting data in a bit serial format, the data comprising an identification of the disk drive.

23. A disk drive as in claim 22, where the identification of the disk drive comprises a World Wide Node Name of the disk drive.

* * * * *